(12) United States Patent
McCloskey et al.

(10) Patent No.: US 11,503,836 B2
(45) Date of Patent: Nov. 22, 2022

(54) PROCESS FOR MAKING LACTOSE-FREE MILK POWDERS

(71) Applicant: Michael J. McCloskey, Dorado, PR (US)

(72) Inventors: Michael J. McCloskey, Dorado, PR (US); Ronald I. Thompson, Holland, MI (US); Steven Cooper, Allendale, MI (US)

(73) Assignee: Michael J. McCloskey, Dorado, PR (US)

(*) Notice: Subject to any disclaimer, the term of this patent is extended or adjusted under 35 U.S.C. 154(b) by 0 days.

(21) Appl. No.: 17/075,050

(22) Filed: Oct. 20, 2020

(65) Prior Publication Data

US 2022/0117246 A1    Apr. 21, 2022

(51) Int. Cl.
| | |
|---|---|
| *A23C 9/152* | (2006.01) |
| *A23C 9/12* | (2006.01) |
| *A23C 9/16* | (2006.01) |
| *A23C 9/156* | (2006.01) |
| *A23C 1/12* | (2006.01) |
| *A23L 29/30* | (2016.01) |
| *A23L 33/21* | (2016.01) |
| *A23C 3/033* | (2006.01) |
| *A23C 9/158* | (2006.01) |

(52) U.S. Cl.
CPC .............. *A23C 9/1206* (2013.01); *A23C 1/12* (2013.01); *A23C 3/033* (2013.01); *A23C 9/156* (2013.01); *A23C 9/158* (2013.01); *A23C 9/16* (2013.01); *A23L 29/30* (2016.08); *A23L 33/21* (2016.08)

(58) Field of Classification Search
CPC ......... A23C 9/1206; A23C 1/12; A23C 3/033; A23C 9/156; A23C 9/158; A23C 9/16; A23L 29/30; A23L 33/21
USPC .......................................................... 426/42
See application file for complete search history.

(56) References Cited

U.S. PATENT DOCUMENTS

| | | |
|---|---|---|
| 7,622,144 B2 | 11/2009 | Girsh |
| 7,829,130 B2 | 11/2010 | Tossavainen et al. |
| 8,986,768 B2 | 3/2015 | Tikanmaki et al. |
| 10,080,372 B2 | 9/2018 | Kallioinen et al. |
| 10,085,462 B2 | 10/2018 | Tossavainen et al. |
| 10,542,763 B2 | 1/2020 | Ur Rehman et al. |
| 2014/0205718 A1 | 7/2014 | Kallioinen et al. |
| 2018/0027864 A1 | 2/2018 | Kallioinen et al. |
| 2018/0070604 A1 | 3/2018 | Carrigan et al. |

(Continued)

FOREIGN PATENT DOCUMENTS

| | | | |
|---|---|---|---|
| BR | 102013001100 A2 | | 8/2014 |
| CN | 102726521 A | * | 10/2012 |
| CN | 105875848 A | | 8/2016 |

(Continued)

OTHER PUBLICATIONS

Translation of CN-102726521-A. (Year: 2012).*

(Continued)

*Primary Examiner* — Brent T O'Hern
(74) *Attorney, Agent, or Firm* — Vorys, Sater, Seymour and Pease LLP; Maryellen Feehery Hank

(57) ABSTRACT

The invention relates to a process for producing a lactose-free milk powder with a fat-standardized content, such as whole milk, skim milk, lowfat milk, organic milk, non-organic milk and the like.

17 Claims, 2 Drawing Sheets

(56) References Cited

U.S. PATENT DOCUMENTS

2019/0150464 A1 5/2019 Sizer
2019/0357557 A1 11/2019 Dunker et al.

FOREIGN PATENT DOCUMENTS

| CN | 107432323 A | 12/2017 |
|---|---|---|
| FR | 2484204 A1 | 12/1981 |
| WO | 2000045643 A | 8/2000 |
| WO | 2015095769 A1 | 6/2015 |

OTHER PUBLICATIONS

"Lactose hydrolyzed milk powder: Thermodymanic characterization of the drying process"; Departamento de Tecnologia de Alimentos (DTA), Universidade Federal de Vicosa (UFA), Vicosa, MG, Brasil; Fialho, T.L. et al., Drying Technology (2018), 36 (8): 922-931.

* cited by examiner

PROCESS FOR MAKING LACTOSE-FREE MILK POWDERS

FIELD OF THE INVENTION

This invention relates to a process for producing a lactose-free milk powder. The process uses the lactase enzyme to convert a substantial portion of the lactose in milk to glucose and galactose. The lactose-free milk is then clarified, pasteurized, evaporated and dried into lactose-free milk powder.

BACKGROUND OF THE INVENTION

Nutrition is one of the cornerstones of health, well-being, and the prevention of numerous chronic diseases. Nutritional products play an important role in these areas and attempts to provide readily available and convenient nutritional products to the general public has been a major focus in recent years. To remain healthy one must receive essential nutrients which are indispensable to human nutrition. Essential nutrients include both macronutrients, such as fats, carbohydrates and proteins, and micronutrients, such as vitamins and minerals (including trace elements and electrolytes).

Milk products constitute a significant portion of the overall diet or calorie consumption of human beings. As such, milk products play a major role in maintaining the health of the public. Nutritionally optimal milk products will have a positive effect on the nutrition and the health of the public.

Milk and dairy products are consumed by large portions of the population. However, the lactose in milk can cause problems with certain people who lack the ability to digest it properly due to a deficiency of the lactase enzyme. For this population, lactose-free milk and dairy products allow them to reap the nutritional benefits and pleasure of dairy consumption without adverse digestive effects.

SUMMARY OF THE INVENTION

This invention provides a process for producing lactose-free milk powder and the product produced by this process. This process will be useful for fat-free, low fat, full-fat, organic, non-organic, flavored and/or unflavored lactose-free milk powder.

It is an object of the invention to provide a process to produce lactose-free milk powder by combining milk and an amount of lactase enzyme to convert a substantial portion of the lactose in the milk to glucose and galactose (becoming "lactose-free milk"), clarifying the lactose-free milk, pasteurizing the lactose-free milk, removing water (for example, without limitation, through evaporation and/or concentration) from the lactose-free milk and drying the lactose-free milk into a lactose-free milk powder.

This invention includes the lactose-free milk powder produced by combining milk and an amount of lactase enzyme to convert a substantial portion of the lactose in the milk to glucose and galactose (becoming "lactose-free milk"), clarifying the lactose-free milk, pasteurizing the lactose-free milk, removing water (for example, without limitation, through evaporation and/or concentration) from the lactose-free milk and drying the lactose-free milk into a lactose-free milk powder.

An embodiment of the invention includes a process to produce lactose-free milk powder by clarifying and pasteurizing milk, then combining the pasteurized milk and an amount of lactase enzyme to convert a substantial portion of the lactose in the milk to glucose and galactose (becoming "lactose-free milk"), removing water (for example, without limitation, through evaporation and/or concentration) from the lactose-free milk and drying the lactose-free milk into a lactose-free milk powder.

An embodiment of the invention includes the lactose-free milk powder produced by clarifying and pasteurizing milk, then combining the pasteurized milk and an amount of lactase enzyme to convert a substantial portion of the lactose in the milk to glucose and galactose (becoming "lactose-free milk"), removing water (for example, without limitation, through evaporation and/or concentration) from the lactose-free milk and drying the lactose-free milk into a lactose-free milk powder.

BRIEF DESCRIPTION OF THE DRAWING

The invention will be better understood by reference to the following detailed description of an embodiment when read in conjunction with the included drawing.

DETAILED DECSRIPTION OF INVENTION

Figure 1:
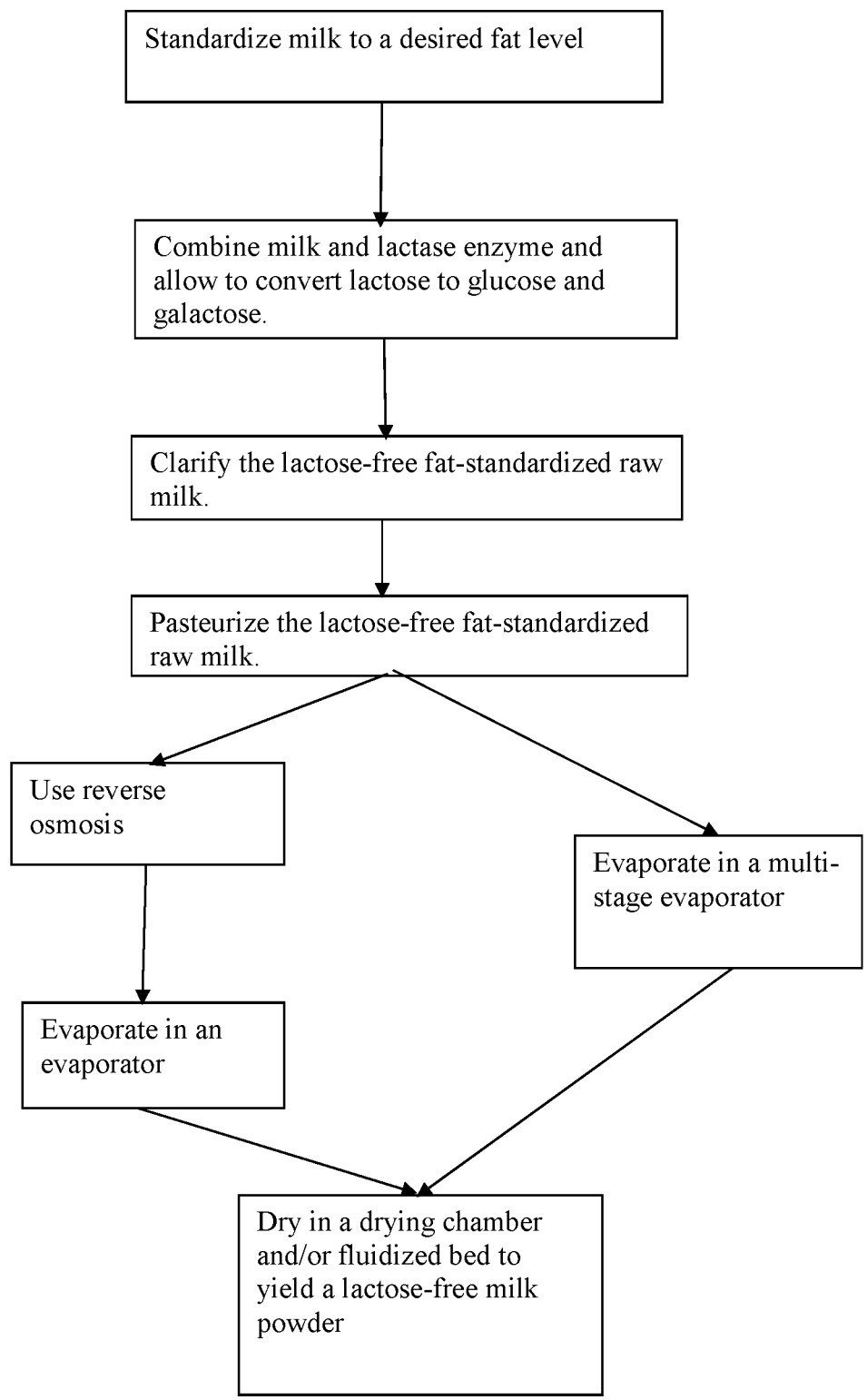
FIG. 1 is a flow diagram representing one embodiment of the steps involved in the process to produce lactose-free milk powder.
Figure 2:
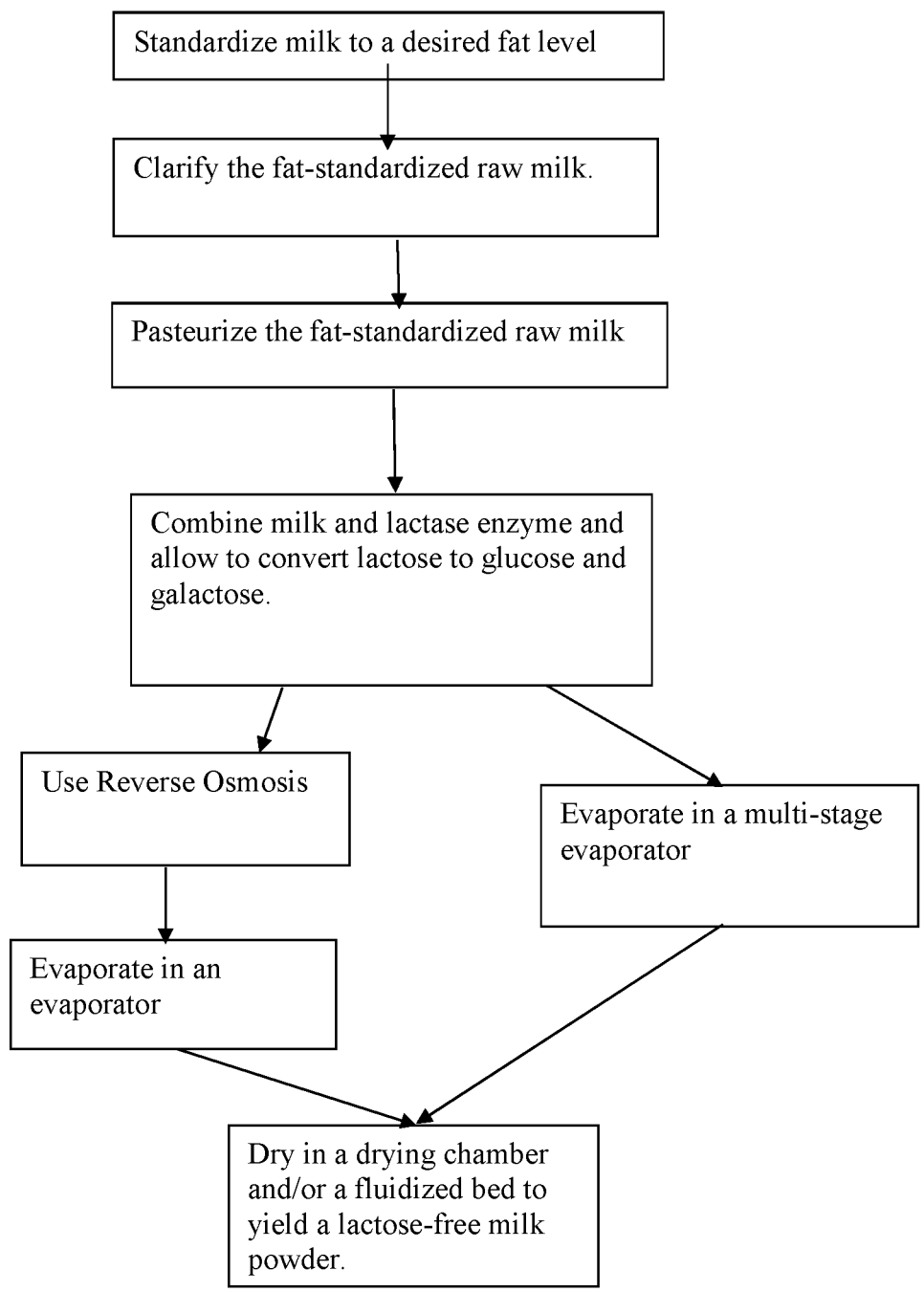
FIG. 2 is a flow diagram representing an embodiment of the steps involved in the process to produce lactose-free milk powder.

As used herein the term "milk" includes milk from animal sources, including but not limited to human, cow, sheep, goat, buffalo, camel, llama, mare and deer. Milk may be organic, non-organic, raw or pasteurized. All percentages expressed herein are weight percentages (wt %), unless otherwise stated.

As used herein the term "fat standardized milk" includes milk in which the original fat content is controlled such that each container of milk will have the specified fat content, and may include controlling the fat and solid not fat (SNF) content. Fat-free milk is also called skim or non-fat, and means milk with 0-0.5 wt %. Low-fat milk is either 1% low-fat or 2% low-fat, which have about 1% and 2% fat respectively. Whole milk or regular milk has about 3.25% fat. The fat content of the milk may be from 0 to 5% of the milk, preferably 0-0.5%, 1-2%, 2-3%, 3-4%, up to 5%. The fat content in the lactose-free milk powder may be from 0 to 50% of the lactose-free milk powder.

As used herein the term "lactose-free milk" is a milk in which the original lactose content in the milk has been converted to glucose and galactose by addition of the lactase enzyme, so that there is no more than about 1%, preferably no more than 0.5%, preferably no more than 0.1%, and preferably no more than 0.01% lactose present in the milk.

As used herein the term "lactose-free milk powder" is a milk powder in which the original lactose content in the milk has been converted to glucose and galactose by addition of the lactase enzyme, so that there is no more than about 1%, preferably no more than 0.5%, preferably no more than 0.1%, and preferably no more than 0.01% lactose present in the milk, which is then dried to a powder. The lactose-free milk powder may have up to about 5%, preferably up to about 4.5% and more preferably up to about 4% moisture on a dry basis. Lactose-free milk powder may be reconstituted to lactose-free milk by the addition of water and agitation or stirring.

As used herein the term "clarification" includes both clarification and separation of the cream and skim milk.

When whole milk is desired, the cream and skim milk are rejoined. When skim milk is desired, the cream is further processed.

The lactose-free milk powder produced by the process described may also be fortified with a protein source, a mineral source, a carbohydrate source or a mixture therefore ("fortifying sources"). Examples of these sources include but are not limited to sources of calcium, vitamin D and protein, such as milk protein, whey protein, caseinate, soy protein, egg white, gelatin, collagen and combinations thereof.

Natural and artificial sweeteners such as cane sugar, beet sugar, high fructose corn syrup, saccharine, aspartame, asulfame K, sucrolose and their combination, as well as others, may be incorporated to enhance the organoleptic and sweetness quality of the compositions. Various fiber sources may be included in the compositions of the present invention. These sources may be selected from such materials as oat fiber, soy fiber, guar gum, pectin, soy polysaccharides, gum arabic, hydrolyzed fibers and the like. Cellulose, hemicellulose, hydrocolloids, methylcellulose, carboxymethyl cellulose and the like are contemplated. Also useful are fructo-oligosaccharides.

Various non-nutritive components can be included in the compositions. For example, fillers, coloring agents, flavors, emulsifiers and the like are useful. Other nutritionally valuable, but non-essential components can be added, including choline, taurine, L-carnitine and the like. Combinations of these non-nutritive and non-essential components are contemplated. Various nutraceuticals and phytochemicals can be incorporated into the compositions for their intended function.

It is contemplated that the processes described, excluding the pasteurization, water removal (e.g. without limitation, evaporation and/or concentration) and drying steps, herein are performed at or below 45 degrees F.

In an embodiment of the invention, lactose-free milk powder is produced by combining milk, which may be fat-standardized raw milk, with an amount of lactase enzyme sufficient to convert at least 99% of the lactose present in the fat-standardized raw milk to glucose and galactose. Then the fat standardized lactose-free raw milk is clarified and pasteurized. The clarification and pasteurization occurs up to 24 hours or between about 24 and about 72 hours, after the conversion step, followed by evaporating water from the fat standardized lactose-free milk. Then, the fat standardized lactose-free milk is dried into a lactose-free milk powder.

In an embodiment, fortifying sources, natural sweeteners, artificial sweeteners, fiber sources, fructo-oligosaccharides, non-nutritive components, non-essential components, nutraceuticals, phytochemicals and mixtures thereof may be added in the process preferably before pasteurization, and/or any time after pasteurization (especially if, not limited to, the ingredient is heat sensitive), to the lactose-free milk powder.

The evaporating step in an embodiment is a multi-stage evaporating step, preferably at least a two-stage step, more preferably a two-stage step.

The evaporating step in an embodiment is a reverse osmosis step followed by an evaporating step.

The drying step in an embodiment occurs in a drying chamber for a specified time and then on a fluidized bed for a second specified time. The specified time and second specified time may be the same, the specified time may be shorter than the second specified time or the specified time may be longer than the second specified time. In an embodiment, the drying in the drying chamber occurs for about ¼ the time the drying occurs on the fluidized bed. For example, the drying in the drying chamber may occur for about 5 minutes and then on the fluidized bed for about 20 minutes. In another embodiment, the drying in the drying chamber may occur for less than about 30 seconds and then on the fluidized bed for about 20 minutes In an embodiment, the drying chamber is temperature controlled to slowly dry the fat-standardized lactose-free milk to powder without burning or causing adverse organoleptic properties such as without limitation a bad taste, smell or texture. In an embodiment, the drying may be slower than if the process was employed for non-lactose-free milk to achieve desired organoleptic properties.

In an embodiment, the drying chamber is air flow controlled to slowly dry the fat-standardized lactose-free milk to powder without burning or causing adverse organoleptic properties such as without limitation a bad taste, smell or texture.

In one embodiment, the drying chamber has at least one nozzle with an orifice, preferably up to 12 nozzles, or more than 12 nozzles wherein the orifice has a size which correlates to a particle size, solubility and/or density of the desired fat-standardized lactose-free milk powder. In an embodiment, the orifice size is 0.016 to 0.106 inches. In an embodiment, the orifices produce droplet sizes of 20 to 650 microns. Nozzles and orifices are discussed in Spray Drying Products SDX V Spray Dry Nozzles Product Guide, UTC Aerospace Systems, www.delavan.co.uk, and SprayDry Nozzles, Spraying Systems Co., www.spray.com.

In an embodiment, the fluidized bed is temperature controlled to slowly dry the fat-standardized lactose-free milk to powder without burning or causing adverse organoleptic properties such as without limitation a bad taste, smell or texture.

In an embodiment, the fluidized bed step is air flow controlled to slowly dry the fat-standardized lactose-free milk to powder without burning or causing adverse organoleptic properties such as without limitation a bad taste, smell or texture.

In another embodiment, the drying step occurs only in the drying chamber.

In another embodiment, the drying step occurs only in a fluidized bed.

The invention also encompasses the lactose-free milk powder produced by any of the process embodiments described herein.

An embodiment is a lactose-free milk powder produced by the process described wherein the powder has less than about 4% weight moisture of the total weight of the powder, less than about 0.1% weight lactose of the total weight of the powder, and milk proteins and minerals in the same relative proportions as in non-powdered milk with the relevant standardized fat level.

There are several examples of the invention, which are not limiting.

Example 1 Lactose Free Whole Milk Powder

A lactose-free whole milk powder was produced by combining fat standardized raw whole milk and lactase enzyme, clarifying the fat standardized lactose-free raw whole milk within 24 hours after the combining step, pasteurizing the fat standardized lactose-free raw whole milk, evaporating water from the fat standardized lactose-free whole milk, wherein the evaporating comprises a reverse osmosis step and then an evaporating step, and drying the fat standardized lactose-free whole milk into a lactose-free whole milk powder.

|  | Per 100 grams |
|---|---|
| Calories | 477 Cal |
| Calories from Fat | 213 Cal |
| Total Carbohydrates | 40.7 g |
| Saturated Fatty Acids (Acid Form) | 15.5 g |
| Total Cis Unsaturated Fatty Acids (Acid Form) | 5.92 g |
| Monounsaturated Fatty Acids (Acid Form) | 5.12 g |
| Polyunsaturated Fatty Acids (Acid Form) | 0.796 |
| Trans Fatty Acids (Acid Form) | 1.05 g |
| Cholesterol | 103 mg |
| Total Dietary Fiber | 1.17 g |
| Fructose | <0.1 g |
| Glucose | 17.7 g |
| Sucrose | <0.1 g |
| Lactose | <0.1 g |
| Maltose | <0.1 g |
| Galactose | 17.3 g |
| Total Sugar | 35.0 g |
| Total Sugar Alcohol | 0.0525 g |
| Protein | 25.9 g |
| Vitamin A as Retinol | 576 IU |
| Calcium | 887 mg |
| Total Vitamin D3 | <0.100 mcg |
| Total Vitamin D2 | <0.100 mcg |
| Moisture | 4.64 g |
| Lactic Acid | <40.0 mg |

Caloric calculations: United States Department of Agriculture, "Energy Value of Foods,
"Agriculture Handbook No. 74, pp 2-11 (1973). 21 CFR 101.9, pp. 24-25.
Fatty Acid Profile: Official Method No. 996.06, Official Methods of Analysis of the AOAC INTERNATIONAL (modified), 19$^{th}$ ed., AOAC INTERNATIONAL: Gaithersburg, Md. (2012)
Moisture: Official Methods of Analysis of AOAC INTERNATIONAL. 18$^{th}$ ed., Methods 925.45, AOAC INTERNATIONAL, Gaithersburg, Md. (2005) (modified).
Protein: Official Methods of Analysis of AOAC INTERNATIONAL. 18$^{th}$ ed., Methods 968.06, AOAC INTERNATIONAL, Gaithersburg, Md. (2005) (modified).
Sugar Alcohol Profile: Food Integrity Innovation-Madison method.
Fiber: Official Methods of Analysis of AOAC INTERNATIONAL. 18$^{th}$ ed., Methods 991.43, AOAC INTERNATIONAL, Gaithersburg, Md. (2005) (modified).
Vitamin A as Retinol: Official Methods of Analysis of AOAC INTERNATIONAL, Methods 992.04, 992.06, 2001.12, AOAC INTERNATIONAL, Gaithersburg, Md. (modified).
Vitamin D: Official Methods of Analysis of AOAC INTERNATIONAL. Current ed. (as of April 2020), Methods 2011.11, AOAC INTERNATIONAL, Gaithersburg, Md.
Huang M., et al, "Measurement of Vitamin D in Foods and Nutritional Supplements by Liquid Chromatography/Tandem Mass Spectrometry," Journal of AOAC International, Vol. 92, No. 5:1327-1335 (2009).

Example 2 Lactose Free Nonfat Milk Powder

A lactose-free nonfat milk powder was produced by clarifying raw milk into fat standardized raw nonfat milk, combining fat standardized raw nonfat milk and lactase enzyme and holding for 24 hours, pasteurizing the fat standardized lactose-free raw nonfat milk, evaporating water from the fat standardized lactose-free nonfat milk, wherein the evaporating comprises a reverse osmosis step and then an evaporating step, and drying the fat standardized lactose-free nonfat milk into a lactose-free nonfat milk powder.

| Calories | 352 Cal |
|---|---|
| Calories from Fat | 5.94 Cal |
| Total Carbohydrates | 51.6 g |
| Saturated Fatty Acids (Acid Form) | 0.389 g |
| Total Cis Unsaturated Fatty Acids (Acid Form) | 0.170 g |
| Monounsaturated Fatty Acids (Acid Form) | 0.141 g |
| Polyunsaturated Fatty Acids (Acid Form) | 0.029 g |
| Trans Fatty Acids (Acid Form) | 0.660 g |
| Cholesterol | 28.5 mg |
| Total Dietary Fiber | 1.18 g |
| Fructose | <0.1 g |
| Glucose | 24.7 g |
| Sucrose | <0.1 g |
| Lactose | <0.1 g |
| Maltose | <0.1 g |
| Galactose | 23.7 g |
| Total Sugar | 48.4 g |
| Total Sugar Alcohol | 0.0516 g |
| Protein | 35.6 g |
| Vitamin A as Retinol | <100 IU |
| Calcium | 1190 mg |
| Total Vitamin D3 | <0.100 mcg |
| Total Vitamin D2 | <0.100 mcg |
| Moisture | 5.17 g |
| Lactic Acid | <40.0 mg |

Same methods were employed as Example 1.

These examples illustrate at least some of the advantages of the invention. The embodiments described in the present description are given by way of non-limiting illustration, those of ordinary skill in the art being easily able to, in light of this description, modify these embodiments, or envisage others, while remaining within the scope of the invention.

The various characteristics of these embodiments may be used alone or be combined with one another. When they are combined, these characteristics may be combined as described above or differently, the invention not being limited to the specific combinations described in the present description. In particular, unless specified otherwise, a characteristic described in relation to an embodiment may be applied analogously to another embodiment.

What is claimed is:

1. A process to produce a lactose-free milk powder comprising the steps of:
   standardizing raw milk to a desired fat level to yield a fat standardized raw milk,
   combining the fat standardized raw milk and an amount of lactase enzyme wherein the amount of lactase enzyme is sufficient to convert at least 99.0% of lactose present in the raw milk to make a fat standardized lactose-free raw milk,
   clarifying the fat standardized lactose-free raw milk within 24 hours after the combining step,
   pasteurizing the fat standardized lactose-free raw milk,
   removing water from the fat standardized lactose-free milk, and
   drying the fat standardized lactose-free milk into a lactose-free milk powder.

2. The process of claim 1 wherein the fat-standardized raw milk is fat standardized whole milk and the lactose-free milk powder is lactose-free fat standardized whole milk powder.

3. The process of claim 1 wherein the fat-standardized raw milk is fat standardized nonfat milk and the lactose-free milk powder is lactose-free fat standardized nonfat milk powder.

4. The process of claim 1 wherein the fat standardized raw milk is fat standardized lowfat milk and the lactose-free milk powder is lactose-free fat standardized lowfat milk powder.

5. The process of claim 1 wherein the removing water comprises evaporating in a multi stage evaporator.

6. The process of claim 1 wherein the removing water comprises subjecting the fat standardized lactose-free milk to reverse osmosis and then to an evaporator.

7. The process of claim 1 wherein the drying occurs in a drying chamber.

8. The process of claim 1 wherein the drying occurs on a fluidized bed.

9. The process of claim 1 wherein the drying occurs in a drying chamber for a time and then on a fluidized bed for a second time.

10. The process of claim 1 wherein the removing water comprises concentrating.

11. The process of claim 9 wherein the fluidized bed has a controlled temperature profile to adjust the drying to achieve the fat standardized lactose-free milk powder without adverse consequences, wherein the adverse consequences comprise burning the powder, causing a burnt taste, burnt smell or burnt look for the powder, or a combination thereof.

12. The process of claim 9 wherein the fluidized bed has a controlled air flow profile to adjust the drying to achieve the fat standardized lactose-free milk powder without adverse consequences, wherein the adverse consequences comprise burning the powder, causing a burnt taste, burnt smell or burnt look for the powder, or a combination thereof.

13. The process of claim 9 wherein the drying chamber has at least one nozzle with an orifice, wherein the orifice has a size which directly correlates to a particle size, solubility and/or density of the fat-standardized lactose-free milk powder.

14. The process of claim 1 further comprising adding one or more fortifying sources, natural sweeteners, artificial sweeteners, fiber sources, fructo-oligosaccharides, non-nutritive components, non-essential components, nutraceuticals, and phytochemicals to the lactose-free milk powder.

15. The process of claim 1 consisting of
the standardizing step,
the combining step,
the clarifying step,
the pasteurizing step,
the removing step, and
the drying step.

16. A process to produce a lactose-free milk powder comprising the steps of:
standardizing raw milk to a desired fat level to yield a fat standardized raw milk,
combining the fat standardized raw milk and an amount of lactase enzyme wherein the amount of lactase enzyme is sufficient to convert at least 99.0% of lactose present in the raw milk to make a fat standardized lactose-free raw milk,
clarifying the fat standardized lactose-free raw milk within 24 hours after the combining step,
pasteurizing the fat standardized lactose-free raw milk,
evaporating water from the fat standardized lactose-free milk by reverse osmosis and then in an evaporator,
drying the fat standardized lactose-free milk into a lactose-free milk powder wherein the drying occurs in a drying chamber for a time and then on a fluidized bed for a second time, and
adding one or more fortifying sources, natural sweeteners, artificial sweeteners, fiber sources, fructo-oligosaccharides, non-nutritive components, non-essential components, nutraceuticals, and
phytochemicals to the lactose-free milk powder, wherein the adding may occur at any time in the process.

17. A process to produce a lactose-free milk powder comprising
standardizing raw milk to a desired fat level,
clarifying the fat standardized raw milk,
pasteurizing the fat standardized raw milk,
combining fat standardized milk and an amount of lactase enzyme wherein the amount of lactase enzyme is sufficient to convert at least 99.0% of lactose present in the raw milk to make a fat standardized lactose-free milk,
evaporating water from the fat standardized lactose-free milk in a multi-stage evaporator, and
drying the fat standardized lactose-free milk into a lactose-free milk powder.

* * * * *